(12) United States Patent
Tang

(10) Patent No.: US 7,679,904 B2
(45) Date of Patent: Mar. 16, 2010

(54) HOUSING OF FOLDABLE ELECTRONIC DEVICE

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/193,768

(22) Filed: Aug. 19, 2008

(65) Prior Publication Data

US 2009/0190306 A1 Jul. 30, 2009

(30) Foreign Application Priority Data

Jan. 29, 2008 (CN) .................. 2008 1 0300246

(51) Int. Cl.
*G06F 1/16* (2006.01)

(52) U.S. Cl. ............... 361/679.58; 16/225; 455/573.5; 292/214; 248/309.1

(58) Field of Classification Search .......... 16/223, 16/274, 225, 330; 345/1.3, 87, 173; 361/679.55, 361/679.58, 679.08, 679.01, 679.27, 679.46, 361/679.15; 455/566, 575.3; 248/458, 309.1; 312/223.2, 223.3, 223.4; 439/64, 76.1
See application file for complete search history.

(56) References Cited

U.S. PATENT DOCUMENTS

| 7,490,874 | B2 * | 2/2009 | Chen | 292/214 |
| 2007/0072656 | A1 * | 3/2007 | Lo et al. | 455/575.3 |
| 2008/0040884 | A1 * | 2/2008 | Guo | 16/87.2 |
| 2008/0087050 | A1 * | 4/2008 | Chen | 70/57 |
| 2009/0051174 | A1 * | 2/2009 | Ho | 292/251.5 |

* cited by examiner

*Primary Examiner*—Hung V Duong
(74) *Attorney, Agent, or Firm*—Zhigang Ma

(57) ABSTRACT

An exemplary housing includes a first cover, a second cover for coupled with the first cover, a trigger, two movable latches, a first resilient member, two second resilient members, and two extending arms. The first cover includes two engaging portions. The trigger is disposed on the second cover and slidable along a first direction. The movable latches are disposed on the second cover and slidable along a second direction. Each movable latch includes an engaging portion for engaging the engaging portions of the first cover. The resilient members are configured for resetting the trigger and the movable latches. The extending arms are rotatably connected to the trigger and the movable latches. A slide of the trigger forces the movable latches to slide, thus making the engaging portions of the first cover and the movable latches engage or disengage each other.

17 Claims, 7 Drawing Sheets

HOUSING OF FOLDABLE ELECTRONIC DEVICE

BACKGROUND OF THE INVENTION

1. Field of the Invention

The present invention generally relates to housings of foldable electronic devices and, particularly, to a housing typically used for a notebook.

2. Discussion of the Related Art

Referring to FIGS. 6 and 7, a typical housing 10 of a foldable electronic device is shown. The housing 10 includes a main body 11, a top cover 12, a sliding member 13, a hook 14, and a spring 15. A latching groove 111 is defined in the main body 11 and the latching groove 111 is adjacent to a side of the main body 11. A rectangular mounting groove 121 is defined in a side of the top cover 12 and the top cover 12 forms a resisting member 123 that is adjacent to the mounting groove 121. The sliding member 13 is disposed in the mounting groove 121 and is capable of sliding, left or right, along the mounting groove 121. The hook 14 is configured to be latched in the latching groove 111. The hook 14 includes an end that is fixed to the sliding member 13 so that the hook 14 is movable together with the sliding member 13. One end of the spring 15 abuts the resisting member 123 and the other end of the spring 15 abuts the hook 14 so that the hook 14 and the sliding member 13 are normally forced to remain on the left side of the mounting groove 121.

To open the top cover 12, a user has to slide the sliding member 13 towards the right side of the mounting groove 121. However, the sliding member 13 is generally designed to be inconspicuous, thereby having a small outer surface area and the outer surface of the sliding member 13 may line up with the surface of the edge (side) of the cover. Thus when sliding the sliding member 13 with a finger, to open the top cover 12, the finger may slip. As a result, opening the top cover 12 is bothersome.

Therefore, a new housing of a foldable electronic device is desired in order to overcome the above-described shortcomings.

SUMMARY

An housing of a foldable electronic device includes a first cover, a second cover coupled with the first cover, a trigger, at least one movable latch, at least one resilient member, and at least one extending arm. The first cover includes at least one engaging portion. The trigger is disposed on the second cover and slidable along a first direction between a first position and a second position. The at least one movable latch is disposed on the second cover and slidable along a second direction substantially perpendicular to the first direction. The at least one movable latch has an engaging portion for engaging the at least one engaging portion of the first cover. The at least one resilient member is configured for resetting the trigger and the at least one movable latch. The at least one extending arm is rotatably connected to the trigger and the at least one movable latch. Sliding of the trigger forces the at least one movable latch to slide, thus making the engaging portions of the first cover and the at least one movable latch engage or disengage each other.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present housing of the foldable electronic device. Moreover, in the drawings, like reference numerals designate corresponding parts throughout several views, and all the views are schematic.

DETAILED DESCRIPTION OF THE EXEMPLARY EMBODIMENTS

Reference will now be made to the drawings to describe an exemplary embodiment of the present housing of the foldable electronic device in detail.

The present housing is used for foldable electronic devices, such as notebooks, cell phones, media players, and so on. In the exemplary embodiment, a housing of a notebook is taken as exemplary device to describe the housing of the present invention.

Figure 1:
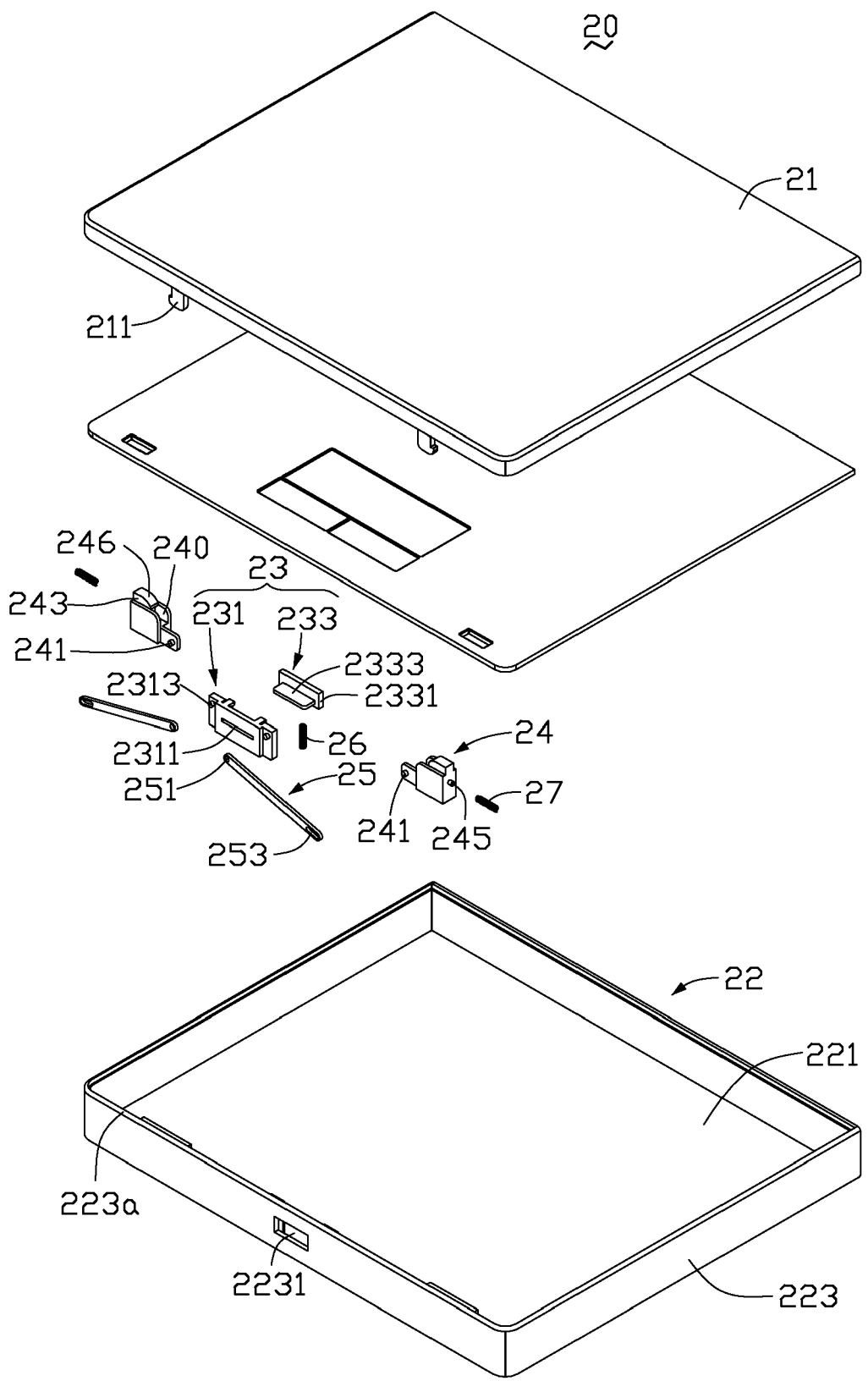
FIG. 1 is an exploded, isometric view of a housing of a foldable electronic device in accordance with an exemplary embodiment of the present invention.
Figure 2:
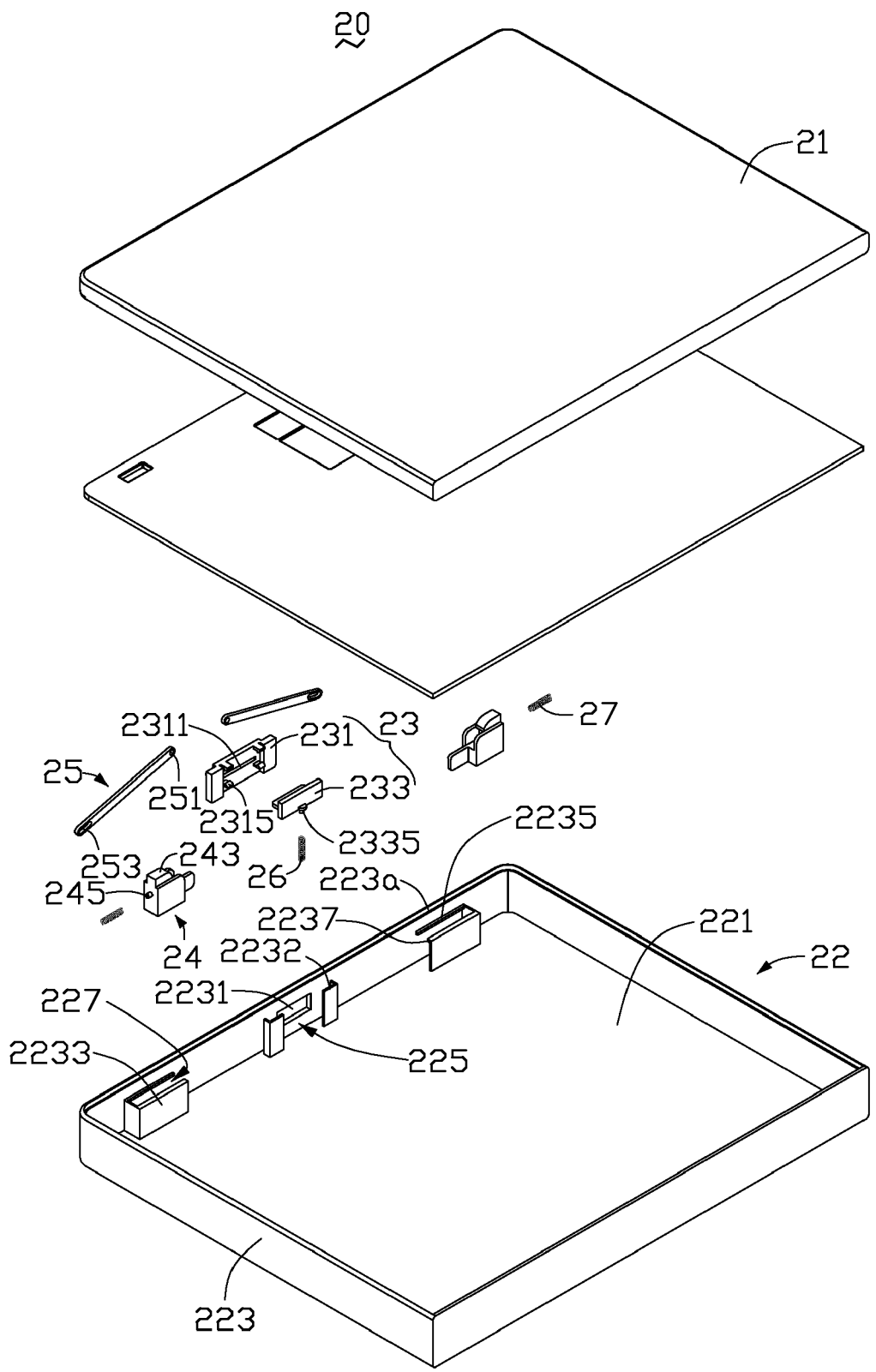
FIG. 2 is similar to FIG. 1, but shows a view from another aspect.

Referring to FIGS. 1 and 2, a housing 20 includes a top cover 21, a main body 22, a trigger 23, two movable latches 24, two extending arms 25, a first resilient member 26, and two second resilient members 27. The top cover 21 includes two hooks 211 formed close to an edge of the top cover 21. The resilient members 26, 27 are springs.

The main body 22 includes a base 221 and a plurality of sidewalls 223. The sidewalls 223 extend from the base 221. A handle slot 2231 is defined in one of the sidewalls 223 (hereinafter referred to as front sidewall 223a). The handle slot 2231 is rectangular in shape. The front sidewall 223a forms two L-shaped trigger brackets 2232 adjacent to the handle slot 2231. The two trigger brackets 2232 are correspondingly located on opposite sides of the handle slot 2231. The trigger brackets 2232 and the front sidewall 223a cooperatively form a trigger guiding portion 225. In this embodiment, the trigger guiding portion 225 is an elongated groove. In addition, the front sidewall 223a further forms two guide rails 2233 and top ends of the guide rails 2233 face the handle slot 2231. The guide rails 2233 are correspondingly formed on symmetrically opposite sides of the trigger guiding portion 225. Each guide rail 2233 and the front sidewall 223a cooperatively form a guiding structure 227. In the illustrated embodiment, the guiding structure 227 is an elongated groove. The front sidewall 223a further forms two restricting guard rails 2235.

The restricting guard rails 2235 on the front sidewall 223a are parallel and opposite to the restricting rims 2237 of the guide rails 2233 correspondingly.

The trigger 23 includes a base member 231 and an actuator 233. The base member 231 defines a lever slot 2311 in a middle portion. One surface of the base member forms two pins 2313 at two sides of the lever slot 2311, and another surface of the base member 231 forms two clips 2315. The actuator 233 includes a handle 2331 and a mounting portion 2333 perpendicularly formed on the handle 2331. The mounting portion 2333 is configured to be insertable in the lever slot 2311 of the base member 231, thereby forming the trigger 23. The actuator 233 further forms a protrusion 2335 at a bottom edge. Alternatively, the base member 231 and the actuator 233 maybe integrally formed.

Each of the movable latches 24 is substantially a block. The movable latch 24 defines a hook slot 240 for engaging one of the hooks 211 of the top cover 21. The movable latch 24 forms a protrusion 241 and a knob 245. The protrusion 241 and the knob 245 are at opposite sides of the movable latch 24 and extend along perpendicular directions. The movable latch 24 further forms a hook 243 at a top of the hook slot 240. The hook 243 has an inclined surface 246.

The extending arm 25 is an elongated bar defining a pivot hole 251 and a guiding slot 253 at opposite ends respectively.

Figure 3:
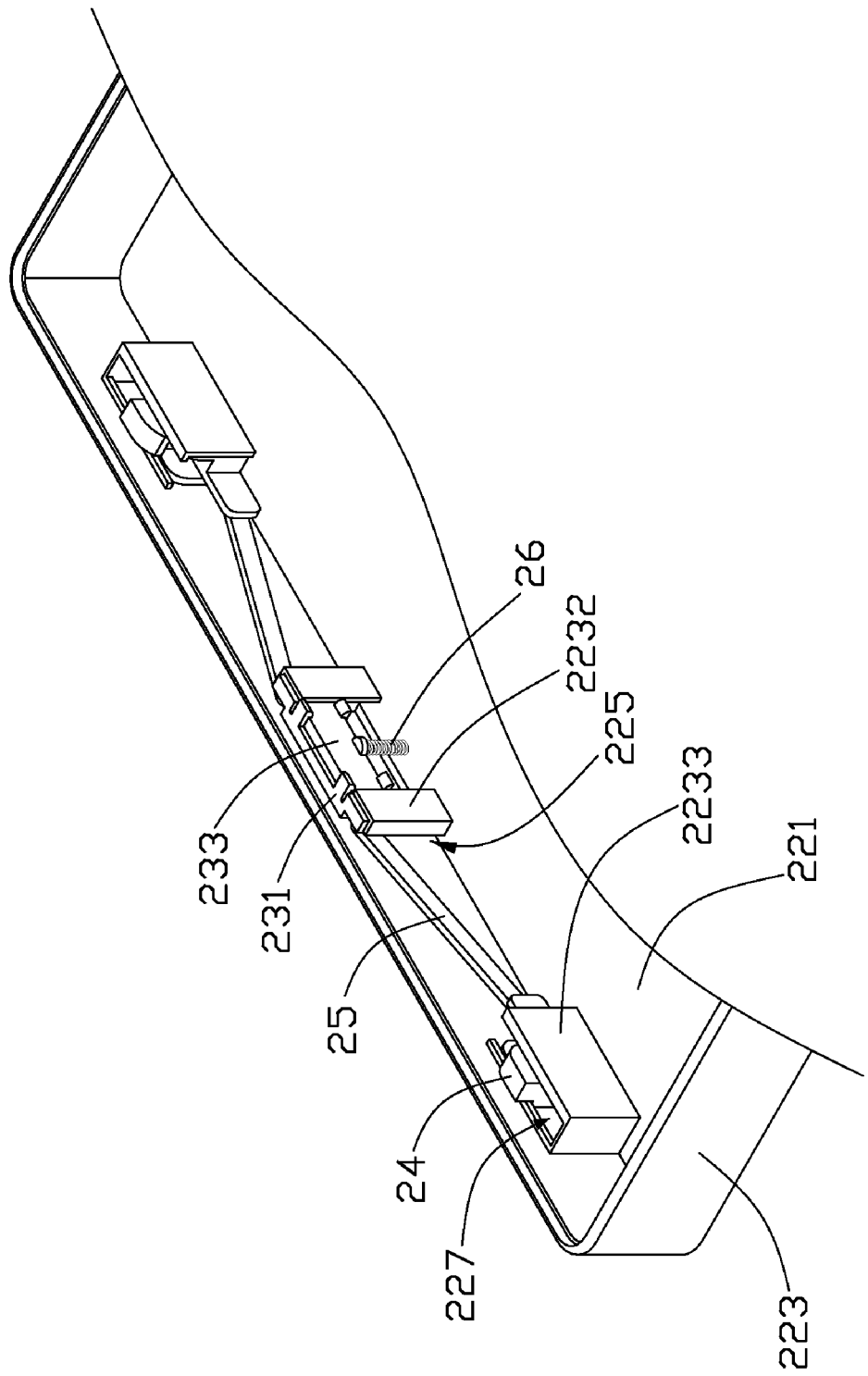
FIG. 3 is part of an assembled, isometric view of the housing in FIG. 1.

Referring also to FIG. 3, in an assembly process, the pivot holes 251 and the guiding slots 253 of each extending arm 25 are rotatably engaged with the pins 2313 of the trigger 23 and the protrusions 241 of the movable latch 24 respectively. One end of each of the second resilient members 27 is sleeved on the knob 245 of one of the movable latches 24 correspondingly, the other ends of the second resilient members 27 resist the inner walls guide rails 2233 of the main body 22 correspondingly and the movable latches 24 are slidably received in the guiding structures 227. Thus, the second resilient members 27 resist the guide rails 2233 and the movable latches 24 correspondingly. The restricting guard rail 2235 and the restricting rims 2237 of the main body 22 prevent the movable latches 24 from detaching out from a top of the guiding structure 227. The mounting portion 2333 of the actuator 233 is inserted in the lever slot 2311 of the base member 231, thus forming the trigger 23. The clips 2315 of the base member 231 clip an edge of the handle 2331 of the actuator 233, thereby preventing the actuator 233 from disengaging from the base member 231. The trigger 23 is slidably received in the trigger guiding portion 225. The mounting portion 2333 of the trigger 23 is inserted through the handle slot 2231 of the main body 22. The mounting portion 2333 is slidable in the handle slot 2231 because a height of the handle slot 2231 is larger than a thickness of the mounting portion 2333. Sliding directions of the movable latches 24 and the trigger 23 are perpendicular to each other. In the housing 20, the movable latches 24 and trigger 23 are configure in a way such that when the trigger 23 moves in a first direction, the movable latches 24 move perpendicular to the first direction. One end of the first resilient member 26 is sleeved on the protrusion 2335 of the trigger 233. Opposite ends of the first resilient member 26 correspondingly resist the base 221 and the trigger 233.

Figure 4:
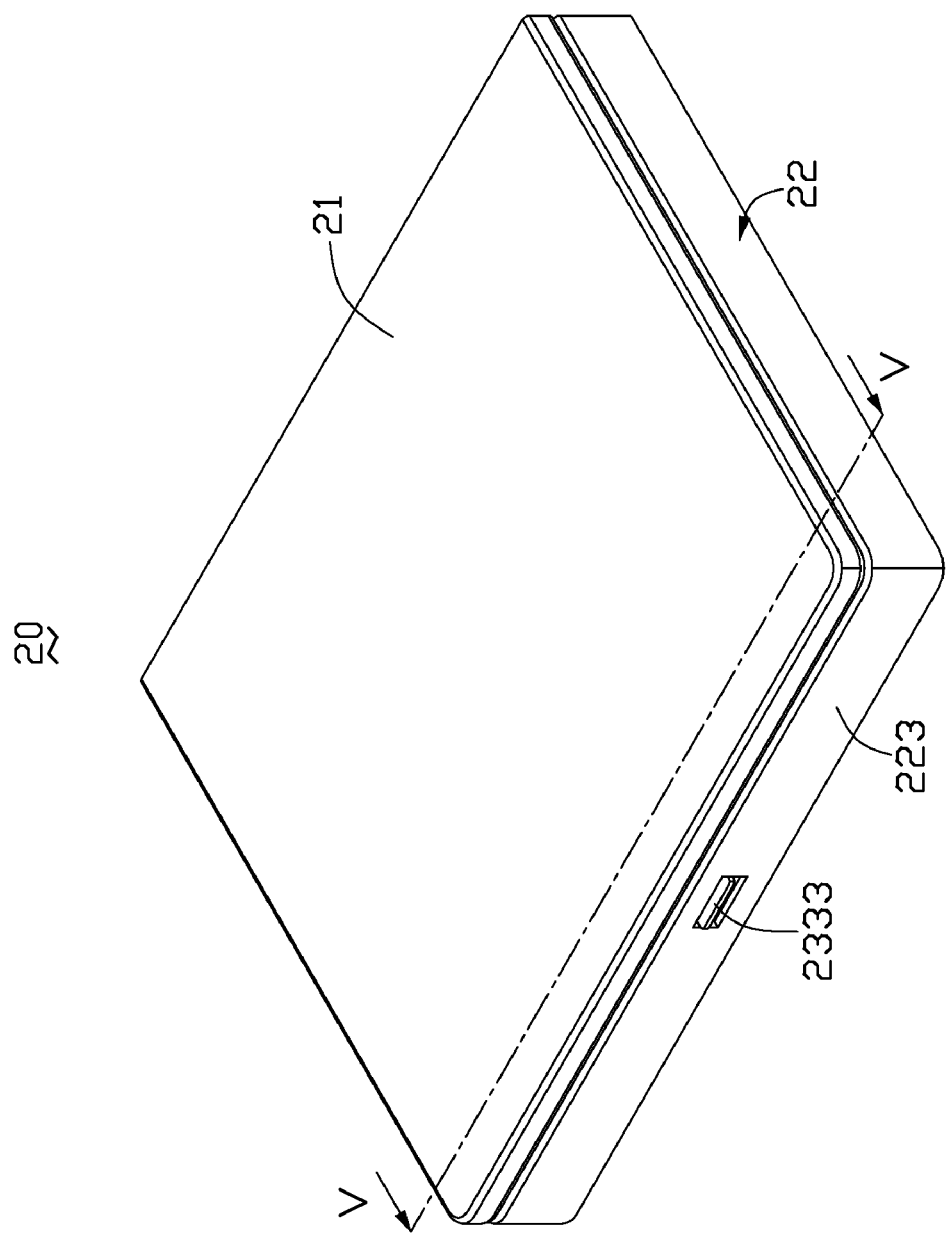
FIG. 4 is an assembled, isometric view of the housing in FIG. 1.
Figure 5:
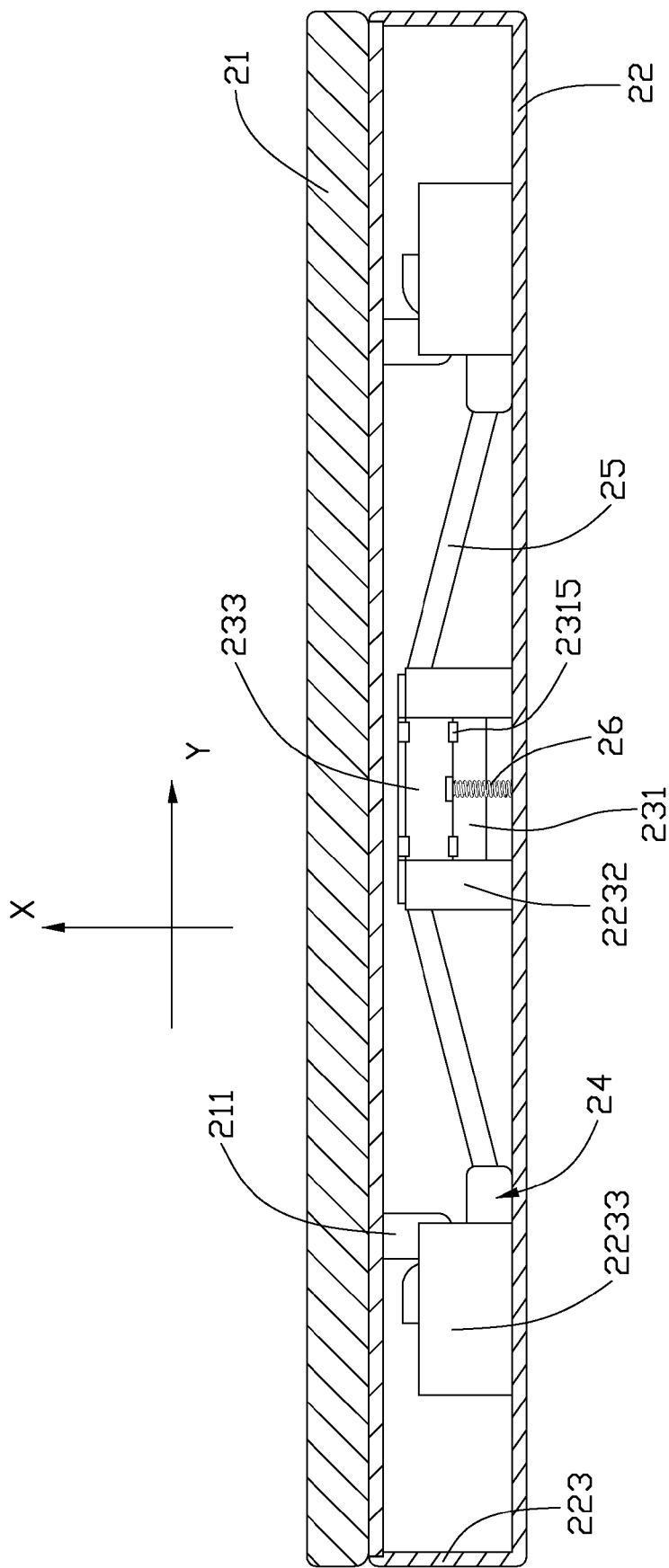
FIG. 5 is a cross-sectional view of the housing taken along line V-V in FIG. 4.
Figure 6:
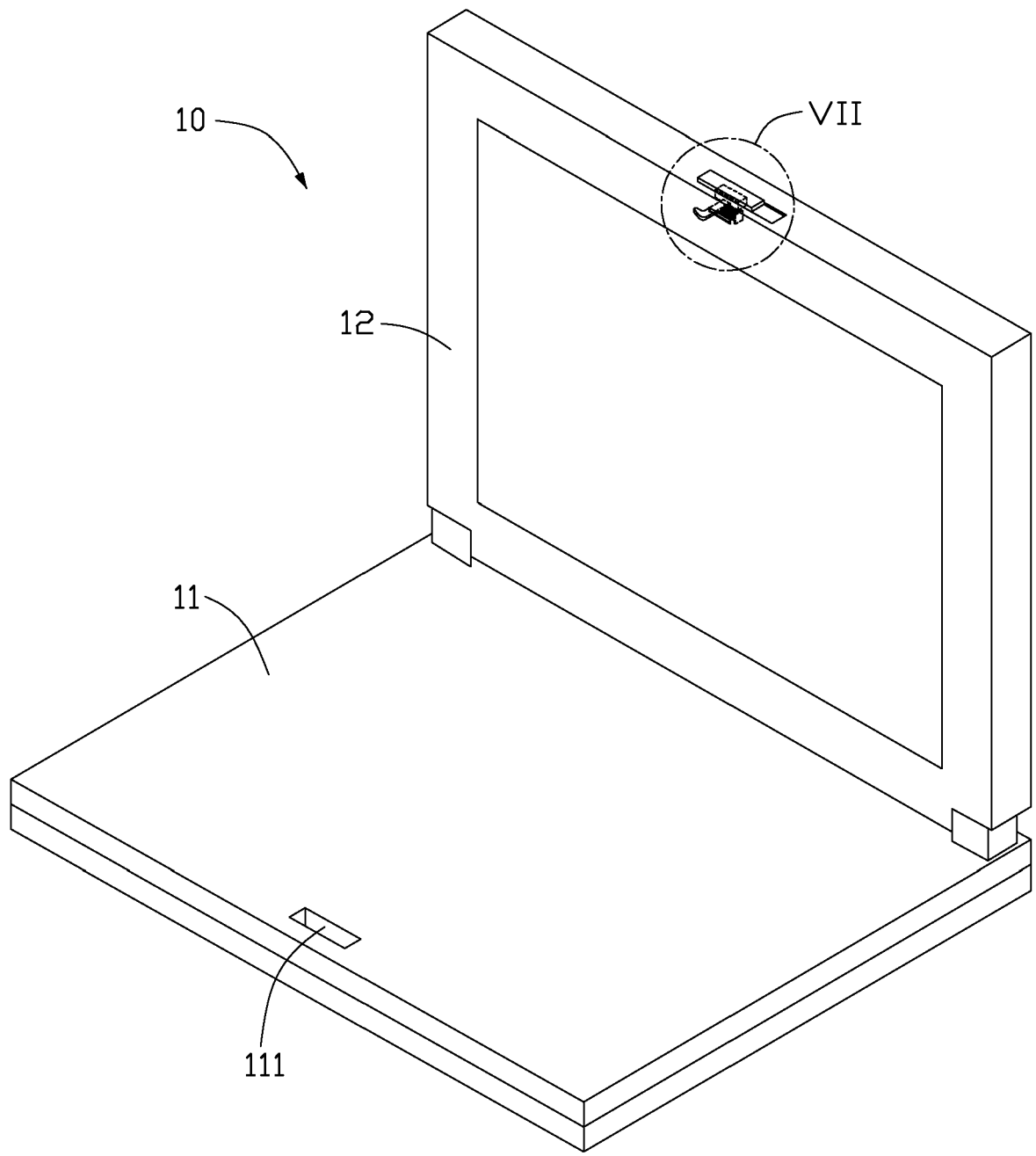
FIG. 6 is an isometric view of a related-art housing of a foldable electronic device.
Figure 7:
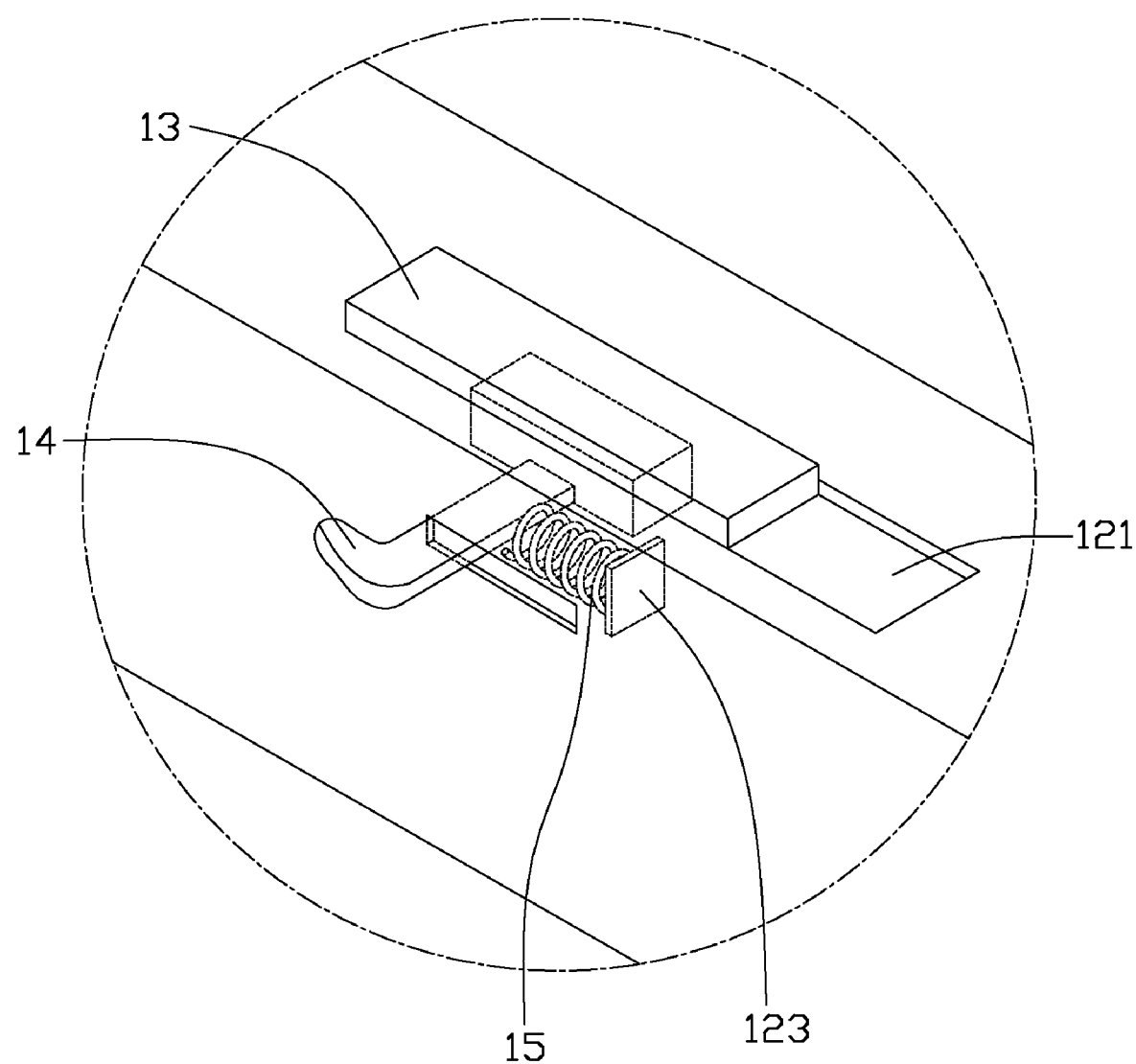
FIG. 7 is an enlarged view of the circled portion VII in FIG. 6.

Referring to FIGS. 4 and 5, when the notebook is in a folded state, the top cover 21 is folded a top of the main body 22 and the hooks 211 of the top cover 21 are secured in the hook slots 240 of the movable latches 24 correspondingly. The first resilient member 26 is compressed and an elastic force of the first resilient member 26 pushes the trigger 23 positioning a direction away from the main body 22. In this state, the movable latches 24 are restricted in position, therefore, the hooks 211 of the top cover 21 cannot disengage from the hook slots 240 of movable latches 24. Thus, the top cover 21 cannot be opened arbitrarily.

To open the top cover 21, an external force is applied against the mounting portion 2333 of the trigger 23. The trigger 23 slidably moves in a first direction (i.e., X-direction) towards the base 221, thus to a bottom position. The base member 231 moves toward the base 221 and the extending arms 25 spread out around the pins 2313 correspondingly to a wider angle to each other. As a result, the extending distance of the extending arms 25 from the trigger 23 relative the base 221 increases, thereby pushing and displacing the movable latches 24 away from each other. When the movable latches 24 are pushed outwards, the hooks 211 of the top cover 21 are released/disengaged from the hook slots 240 of the movable latches 24 correspondingly. As a result, the top cover 21 can be opened. The first resilient member 26 is compressed. When the external force on the trigger is released after the top cover 21 is opened, the elastic force of the first resilient member 26 pushes the trigger 23 to return to a normal position. As a result, the extending distance of the extending arms 25 from the trigger 23 relative the base 221 decreases and the movable latches 24 slide to their original positions due to the elastic force of the first resilient member 26.

To fold the top cover 21 on top of the main body 22, another external force is applied on the top cover 21 and therefore pushes down the hooks 211 to engage in the hook slots 240. To lock the top cover 21 to the base 221, the top cover 21 is first folded over the base 221. As a result, the hooks 211 would push against the inclined surfaces 246 correspondingly, and drive the movable latches 24 to move outwards away from each other. When the hooks 211 are correspondingly pushed pass the inclined surfaces 246 and into the hook slots 240, because the hooks 211 no longer push against the movable latches 24, the elastic force of the first resilient member 26 would push the movable latches 24 inwards toward each other, thereby locking the hooks 211 in the hook slots 240. In the process, the hooks 211 resist the inclined surfaces 246 of the movable latches 24 to make the movable latches 24 move away from each other. Once the hooks 211 engage the hook slots 240, the movable latches 24 reset to their original positions.

Furthermore, the second resilient members 27 are compressed during top cover 21 is folded on the main body 22. In the state, elastic forces of the second resilient members 27 pushes against the movable latches 24, thereby, preventing the movable latches 24 from sliding away from each other and thus inadvertently releasing the 211 and allowing the cover to swing open. In the process of opening the top cover 21 from the main body 22, the second resilient members 27 are compressed. After the top cover 21 is opened, elastic forces of the second resilient members 27 force the movable latches 24 to slide to their original positions. It should be pointed that, the second resilient members 27 have same function as the first resilient member 26. Therefore, in alternative embodiments, the housing 20 may include only the first resilient member 26, only the second resilient members 27, or both of the first and second resilient members 26, 27.

For the housing 20, the top cover 21 can be flipped opened with pushing the trigger 23. Therefore, slippage between a finger and the contact portion 231 seldom happens, therefore the top cover 21 can be easily flipped open.

In alternative embodiments, the first resilient member 26 may be a resilient piece formed on the trigger 23. The second resilient members 27 may be resilient pieces formed on movable latches 24 or the guide rails 2233. The hooks 211 may be formed on the main body 22, and accordingly the trigger 23, the movable latches 24, the extending arms 25, the first resilient member 26, and the second resilient members 27 may be disposed on the top cover 21. The top cover 21 may has only one or more than two hooks 211. Only one movable latch 24, and only one extending arm 25 may be provided. The hooks 211 and the hook slots 240 may be engaging portions with other structures, for example, the hooks 21 replaced by slots and the hook slots 240 replaced by hooks.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A housing of a foldable electronic device, the housing comprising:
    a first cover including at least one engaging portion;
    a second cover rotatably coupled with the first cover;
    a trigger disposed on the second cover, the trigger being slidable along a first direction between a first position and a second position;
    at least one movable latch disposed on the second cover, the at least one movable latch being slidable along a second direction, the at least one movable latch having an engaging portion for engaging the at least one engaging portion of the first cover correspondingly;
    at least one resilient member for resetting the trigger and the at least one movable latch; and
    at least one extending arm rotatably connected to the trigger and the at least one movable latch;
    wherein sliding of the trigger forces the at least one movable latch to slide, thus making the engaging portions of the first cover and the at least one movable latch engage or disengage with each other.

2. The housing of the foldable electronic device as claimed in claim 1, wherein the second cover defines a handle slot, the trigger comprises a mounting portion; the trigger is received in the second cover and the mounting portion protrudes out of the second cover via the handle slot.

3. The housing of the foldable electronic device as claimed in claim 2, wherein the second cover includes a base and a plurality of sidewalls extending from the base, the handle slot is defined in the sidewalls, the sidewalls form at least one trigger bracket adjacent to the handle slot and at least one guide rail, the at least one trigger bracket and the sidewalls cooperatively form a trigger guiding portion for slidably receiving the trigger, the at least one guide rail and the sidewalls cooperatively form at least one guiding structure for slidably receiving the at least one movable latch.

4. The housing of the foldable electronic device as claimed in claim 3, wherein the sidewalls further form at least one restricting guard rail opposite to the at least one guide rail, and each guide rail has a restricting rim corresponding to each restricting guard rail, and the at least one restricting guard rail and the restricting rim of the at least one guide rail cooperatively prevent the at least one movable latch from falling off.

5. The housing of the foldable electronic device as claimed in claim 2, wherein the trigger comprises a base member and an actuator, the base member defines a lever slot, and forms two clips for clipping the actuator, the actuator includes a handle and the mounting portion, the mounting portion is inserted in the lever slot of the base member.

6. The housing of the foldable electronic device as claimed in claim 1, wherein the each of the at least one movable latch forms a protrusion, the trigger forms at least one pin, each of the at least one extending arm defines a pivot hole and a guiding slot in opposite ends correspondingly, and the protrusion of the one of the at least one movable latch and one pin of the trigger rotatably engage the pivot hole and the guiding slot correspondingly.

7. The housing of the foldable electronic device as claimed in claim 1, wherein the at least one resilient member comprises a first resilient member with two ends resisting the main body and the trigger correspondingly.

8. The housing of the foldable electronic device as claimed in claim 7, wherein the at least one resilient member further comprises at least one second resilient member, each second resilient member has two ends resisting the main body and one of the at least one movable latch.

9. The housing of the foldable electronic device as claimed in claim 1, wherein each of the at least one movable latch forms a hook at a top of the engaging portion, the hook has an inclined surface.

10. The housing of the foldable electronic device as claimed in claim 1, wherein the second direction is substantially perpendicular to the first direction.

11. A latching structure for a foldable electronic device, comprising:
    at least one first engaging portion;
    a trigger being slidable along a first direction between a first position and a second position;
    at least one movable latch being slidable along a second direction, each of the at least one movable latch having a second engaging portion for engaging one of the at least one first engaging portion;
    at least one resilient member for resetting the trigger and the at least one movable latch; and
    at least one extending arm, each being rotatably connected to the trigger and one of the at least one movable latch;
    wherein sliding of the trigger forces the at least one movable latch to slide, thus making the at least one engaging portion engage or disengage with the second engaging portion of the at least one movable latch.

12. The latching structure as claimed in claim 11, wherein the each of the at least one movable latch forms a protrusion, the trigger forms at least one pin, each of the at least one extending arm defines a pivot hole and a guiding slot in opposite ends correspondingly, and the protrusion of the one of the at least one movable latch and one pin of the trigger rotatably engage the pivot hole and the guiding slot correspondingly.

13. The latching structure as claimed in claim 11, wherein the at least one resilient member comprises a first resilient member with two ends resisting the main body and the trigger correspondingly.

14. The latching structure as claimed in claim 13, wherein the at least one resilient member further comprises at least one second resilient member, each second resilient member has two ends resisting the main body and one of the at least one movable latch.

15. The latching structure as claimed in claim 11, wherein the trigger comprises a base member and an actuator, the base member defines a lever slot, the base member forms two clips for clipping the actuator, the actuator includes a handle and a mounting portion, the mounting portion is configured for inserting in the lever slot of the base member.

16. The latching structure as claimed in claim 11, wherein each of the at least one movable latch forms a hook at a top of the engaging portion, the hook has an inclined surface.

17. The latching structure as claimed in claim 11, wherein the second direction is substantially perpendicular to the first direction.

* * * * *